United States Patent
Kelly et al.

(10) Patent No.: US 6,357,659 B1
(45) Date of Patent: Mar. 19, 2002

(54) HANDS FREE OPTICAL SCANNER TRIGGER

(75) Inventors: Brian M. Kelly, Eugene; Brian B. Wood, Creswell; Bruce W. Dozier; David P. Ingles, both of Eugene, all of OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/324,794

(22) Filed: Jun. 3, 1999

(51) Int. Cl.[7] .................................................. G06K 7/10
(52) U.S. Cl. .............................. 235/462.01; 235/462.3; 235/462.31
(58) Field of Search ......................... 235/462.01, 462.3, 235/462.31

(56) References Cited

U.S. PATENT DOCUMENTS

| | | |
|---|---|---|
| 4,639,606 A | 1/1987 | Boles et al. |
| 4,740,675 A | 4/1988 | Brosnan et al. |
| 4,766,297 A | 8/1988 | McMillan |
| 4,893,005 A | 1/1990 | Stiebel |
| 4,933,538 A | 6/1990 | Heiman et al. |
| 5,237,161 A | 8/1993 | Grodevant |
| 5,250,790 A | 10/1993 | Melitsky et al. |
| 5,260,553 A | 11/1993 | Rockstein et al. |
| 5,260,554 A | 11/1993 | Grodevant |
| 5,340,971 A | 8/1994 | Rockstein et al. |
| 5,343,027 A | 8/1994 | Knowles et al. |
| 5,408,080 A | 4/1995 | Zazzu et al. |
| 5,426,288 A | 6/1995 | Obatae t al. |
| 5,449,891 A | 9/1995 | Giebel |
| 5,525,789 A | 6/1996 | Rockstein et al. |
| 5,627,359 A | 5/1997 | Amundsen et al. |
| 5,637,852 A | 6/1997 | Knowles et al. |
| 5,677,523 A | 10/1997 | Coleman |
| 5,686,717 A | 11/1997 | Knowles et al. |
| 5,696,370 A | 12/1997 | Coleman et al. |
| 5,777,315 A * | 7/1998 | Wilz et al. .............. 235/472.01 |
| 5,789,731 A | 8/1998 | Amundsen et al. |
| 5,825,012 A | 10/1998 | Rockstein et al. |
| 5,828,049 A | 10/1998 | Knowles et al. |
| 5,834,750 A | 11/1998 | Coleman et al. |

* cited by examiner

Primary Examiner—Harold I. Pitts
(74) Attorney, Agent, or Firm—Lyon & Lyon LLP

(57) ABSTRACT

A method and apparatus for detecting an object within the field of view of an optical reader, such as bar code scanner. Object detection is determined by a software algorithm that may be embedded in a controller or microprocessor contained within the scanner. The object detection software algorithm uses a current trigger threshold to determine whether there is a change in the amount of reflected light energy sufficient to indicate the presence of motion in the scanner field of view. The system may normalize random noise within a scanner's circuitry and accommodate varying degrees of reflectivity of target materials, without requiring additional circuitry or reflective tape to accurately detect an object.

28 Claims, 9 Drawing Sheets fig. 3 fig. 4 fig. 5 fig. 6 fig. 7

HANDS FREE OPTICAL SCANNER TRIGGER

BACKGROUND OF THE INVENTION

The field of the present invention relates to data reading systems. In particular, a method and apparatus are described herein for detecting objects with an optical reading unit, such as a bar code scanner.

Whether stationary, handheld, or combination stationary/handheld, data reading devices are useful for reading a wide array of indicia found on consumer and industrial products, such as traditional linear or one-dimensional bar codes, two-dimensional symbologies, matrix array symbols, patterns and logos, signatures, and other images. Information encoded in any number of different encoded formats may then be used for numerous applications including retail check-out, inventory management, material handling, manufacturing, and package sortation and transportation.

Current data readers may incorporate techniques for automatically detecting an object and initiating and terminating scanning and decoding operations. For example, a clerk at a check-out line using a handheld scanner that incorporates today's automatic reading techniques now has the option of mounting the scanner in a stand, which advantageously provides hands-free operation, or manually actuating the trigger to begin the data acquisition process.

Despite their apparent advantages, current automated techniques for object detection, as well as symbol scanning and decoding, have their drawbacks. Most techniques for object detection require the use of one or more additional circuits, such as the active and passive circuits described in, for example, U.S. Pat. No. 5,525,789 issued to Rockstein et al. Such circuits typically contain additional components, which may include an infra-red light source, an ultrasonic energy source, focusing lenses, and/or separate photodiodes such as those described in the foregoing patent, that increase the expense, size, and maintenance costs of the data reader.

Moreover, current object detection techniques are typically ineffective. Falsely detecting objects and/or target indicia is a common problem with current object detection techniques as they fail to take into account the random noise inherent within a scanner and the fundamental principle that surface properties of target materials will exhibit varying degrees of reflectivity. For example, U.S. Pat. No. 5,525,789 describes a common technique which determines whether a target is detected by comparing a received signal to an emitted signal within a fixed time limit. A preset time limit or fixed trigger threshold, however, inaccurately assumes a scanner does not produce random noise inherent within the circuitry caused by part tolerances, temperature, etc., and inaccurately assumes that all surface properties of target materials have the same degree of reflectivity. To the contrary, random noise and varying degrees of reflectivity may cause a spatial time variance between an emitted signal and a received signal and this frequency range response cannot be accommodated with a fixed time limit or a fixed trigger threshold. Assuming otherwise will produce trigger sensitivity problems such as a decreased trigger point distance or a continual re-triggering of the scanner if the fixed threshold is improperly set. Although these problems can be minimized or reduced by resetting the fixed time limit or fixed trigger threshold, such a modification is very cumbersome for the user.

An improved automated technique that provides for a good deal of immunity against falsely detecting targets due to random noise within the scanner's circuitry is disclosed in U.S. Pat. No. 5,260,554 issued to Grodevant, which patent is incorporated by reference as if fully set forth herein. This patent discloses a technique of pulsing a light beam toward a reflector, such as reflective tape adhered to the base of a stand used to support the scanning unit. The presence of an object is detected when the number of emitted pulses exceeds two times the number of received pulses during a given time period. The present inventors have recognized the need for an improved system for detecting objects with an optical reader that is real-time responsive to random noise within a scanner's circuitry, accommodates varying degrees of reflectivity of target materials, and requires neither additional circuitry nor reflective tape to accurately detect an object.

SUMMARY OF THE INVENTION

The preferred embodiments relate to a system and method for detecting an object within the field of view of an optical reader, such as bar code scanner. Object detection is determined by a software algorithm that may be embedded in a hardware component of the scanner, such as a controller or microprocessor. The object detection software algorithm uses a current trigger threshold to determine whether there is a change in the amount of reflected light energy sufficient to indicate the presence of motion in the scanner field of view.

In a preferred embodiment, a current trigger threshold is set by pulsing a laser diode, generating a signal of returned light energy, sampling the signal until a transition in the signal occurs, and measuring the amount of time from when the pulse stopped to when the transition occurred. The count value of the current trigger threshold is then preferably deviated by a configurable amount to obtain a current trigger threshold range. A current sample average may then be compared to the current trigger threshold range in order to detect a trigger condition and enable the system for scanning and decoding.

A scanner operating in accordance with the above-described method, may include a scan engine having a light source capable of being modulated, an optical interface for receiving information, and a processor for conditioning the received information and determining whether an object is detected. Advantageously, the effective range of a scanner utilizing the above-described method is increased as a scan event will be triggered based on a relatively small time change. Moreover, the above-described method normalizes random noise within a scanner without additional circuitry or reflective tape. Various other embodiments may utilize some but not all of the above elements, or may include additional refinements, while obtaining the benefit of accurate object detection.

BRIEF DESCRIPTION OF THE DRAWINGS

The various objects, features, and advantages of the present invention may be better understood by examining the Detailed Description of the Preferred Embodiments found below, together with the appended figures, wherein:

FIG. 9b is a flow chart of a data collection routine of the software operation shown in FIG. 9a;

DETAILED DESCRIPTION OF THE PREFERRED EMBODIMENTS

The preferred embodiments will now be described with respect to the drawings. To facilitate the description, any numeral identifying an element in one figure will represent the same element when used in any other figure.

Figure 1:
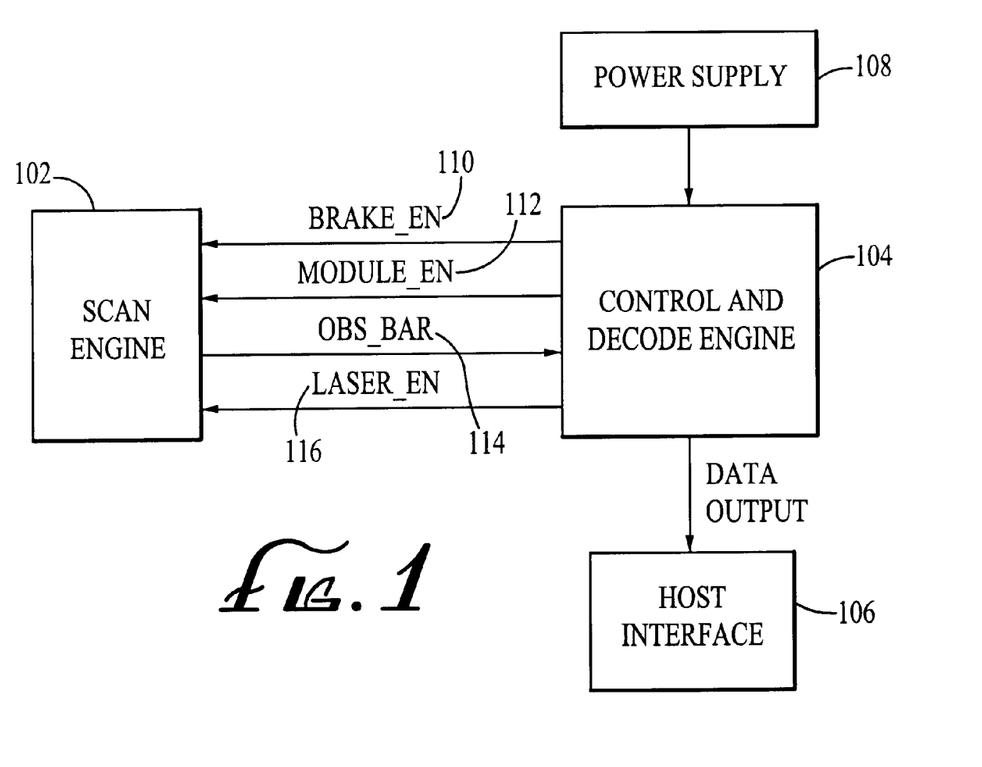
FIG. 1 is a block diagram showing four basic blocks of a simplified optical reader useful in illustrating certain aspects according to a preferred embodiment.

FIG. 1 shows four basic blocks of a simplified optical reader useful in illustrating certain aspects of preferred embodiments. In particular, FIG. 1 illustrates a scan engine block 102, a control and decode engine block 104, a host interface block 106, and a power supply block 108. The following discussion focuses on the scan engine block 102 and the control and engine decode engine block 104 that are particularly pertinent to a method and apparatus according to preferred embodiments for detecting objects with an optical reading unit, such as a bar code scanner.

The scan engine block 102 typically includes an illumination source for illuminating a target or object, whereas the control and engine decode block 104 typically includes a photosensor for collecting the refracted and/or reflected light from the target, a signal processor for conditioning the received information, and a decoder. The artificial illumination source may comprise, for example, a laser diode, an array of light-emitting diodes (LEDs), an incandescent light, or any other suitable light source. The photosensor may comprise, for example, a photo detector diode, a solid-state image sensor such as a charge-coupled device (CCD) linear sensor, a two-dimensional CCD array, or a linear or multi-dimensional CMOS array (such as described in copending U.S. patent application Ser. No. 08/697,408 filed Aug. 23, 1996, hereby incorporated by reference as if set forth fully herein), or any other suitable detecting device. The signal processor may comprise, for example, an analog signal processor and a digitizer or other suitable processor for conditioning the received information. A microcontroller may optionally be in communication with the signal processor and the decoder for receiving and further processing the received information or data.

Figure 2:
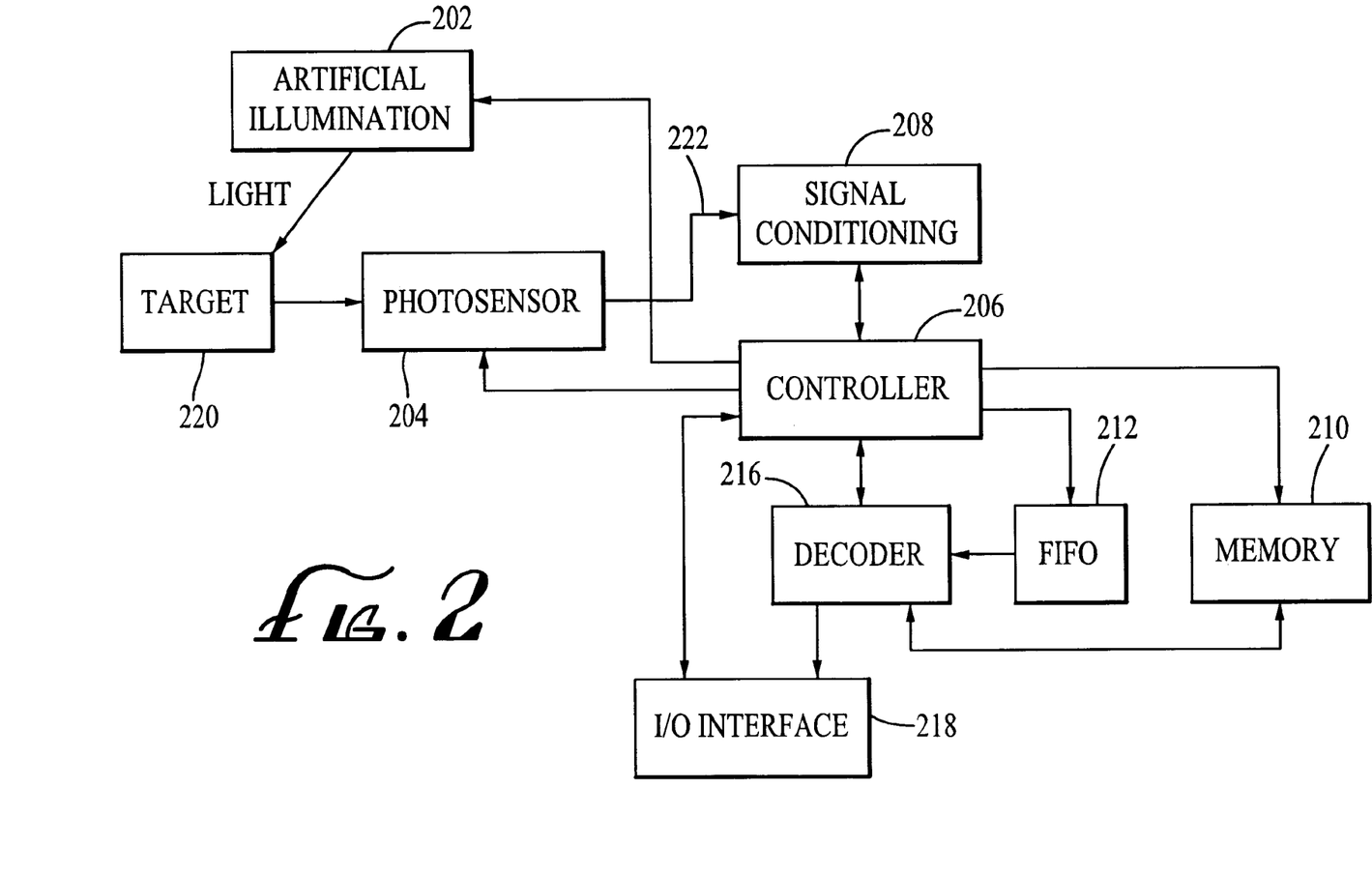
FIG. 2 is a more detailed block diagram including pertinent components of an optical reader illustrative of certain aspects.

FIG. 2 shows a more detailed block diagram including pertinent components of an optical reader illustrative of certain aspects of preferred embodiments. The optical reader may include an artificial illumination source 202, a photosensor 204, a controller 206, a signal conditioning and processing block 208, a memory buffer (e.g., a first-in first-out (FIFO) memory 212), a memory 210, a decoder 216, and an input/output (I/O) interface 218. The optical reader may be configured so as to read and recognize information in more than one data format. Such an optical reader is disclosed in U.S. patent application Ser. No. 09/118,228, filed Jul. 17, 1998, which application is incorporated by reference as if fully set forth herein.

In operation, the artificial illumination source 202 is activated so as to illuminate a target 220 to be read. Light reflected from the target 220 is detected by the photosensor 204, which outputs a signal 222 indicative of lighter and darker portions of the target 220. The photosensor output signal 222 is fed to the signal conditioning and processing block 208, which conditions it and identifies the portions of the signal 222 corresponding to the relatively lighter and darker portions of the target 220. The signal conditioning and processing block 208 can have operating parameters which are dynamically selected by the controller 206. The signal conditioning and processing block 208 outputs data indicative of the relative light and dark portions of the target 220, and this data is stored by the controller 206 in the FIFO 212 for further processing.

The decoder 216 reads data from the FIFO 212 and processes the data to determine whether the data can be recognized. The decoder 216 may operate according to a program stored in the memory 210. The memory 210 may comprise, for example, a flash programmable read-only memory (PROM), and may also comprise a static random-access memory (RAM) which can be used as a scratchpad area. The decoder 216 outputs data across the I/O interface 218 to a host computer or some other system which utilizes the decoded information. The decoder 216 need not be resident in the same device as the other components shown in FIG. 2, but may alternatively be located with a host system.

Figure 3:
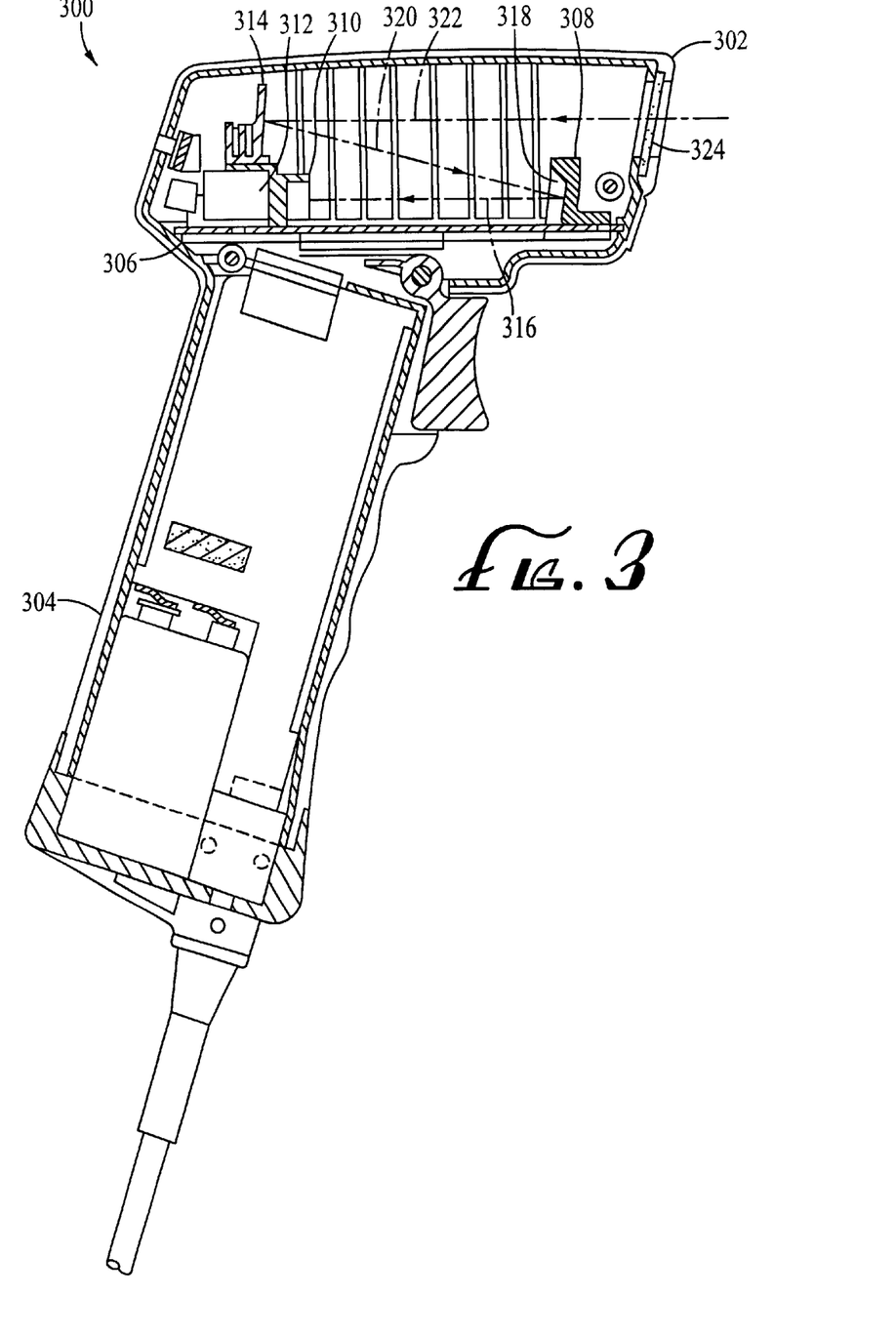
FIG. 3 is an illustrative partially cut-away handheld scanner in accordance with one or more aspects.

The system according to preferred embodiments detects an object within the field of view of an optical reader, such as bar code scanner 300. Scanner 300 may be constructed of a lightweight plastic housing having a head portion 302 and pistol-grip type handle portion 304. The head portion 302 may contain a removable scan module or assembly that contains an optical and electrical assembly. The optical and electrical assembly may include a printed circuit board 306, a collection mirror 308, a laser diode assembly including a laser diode 310, a photodetector and scanning motor assembly 312, and a beam deflector in the form of an oscillating or dithering mirror 314. The laser diode 310 produces a light beam which projects along a first path 316 to a first scanning mechanism or facet 318. The facet 318 may be tilted upwardly so as to project the beam along a second path 320 to the mirror 312. The mirror 312 may be tilted slightly downwardly to project the outgoing beam along a third path 322 through the window 324 towards the object to be detected and a data symbol, if there is one, to be decoded.

The system according to preferred embodiments is particularly well-suited for use with a handheld scanner such as scanner 300 shown in FIG. 3 and disclosed in U.S. Pat. No. 5,260,554, which patent has been incorporated by reference. The scanner 300 shown in FIG. 3 is for illustration purposes only and must not be thought to limit the type of scanner that may utilize any of the preferred embodiments. As such, the system may be utilized with a fixed scanner (such as the fixed scanners disclosed in U.S. patent application Ser. No. 08/659,982, filed Jun. 7, 1996, and in U.S. patent application Ser. No. 09/275,921, filed Mar. 24, 1999, which applications are incorporated by reference as if fully set forth herein), or utilized with a handheld scanner, or any combination thereof (such as handheld scanner 300 illustrated in FIG. 3 that can be mounted on a stand).

In a preferred embodiment as disclosed herein, object detection is determined by a software algorithm that may be embedded in a hardware component of a scanner's circuitry, such as microprocessor or controller 206 shown in FIG. 2. An example of a microprocessor that could be modified to include a software algorithm according to certain aspects of the preferred embodiments is disclosed in U.S. Pat. No. 5,237,161 and illustrated in FIG. 14 thereof. As described in detail below, the object detection software algorithm uses a current trigger threshold to determine whether there is a change in the amount of reflected light energy sufficient to indicate the presence of motion in the scanner field of view.

Referring to FIGS. 1–3 for illustration, the basic operation of certain aspects is now described. When power is applied to the scanner, e.g., scanner 300, a microcontroller, such as controller 206 illustrated in FIG. 2, energizes scan engine 102 via a MODULE_EN signal 112, which remains energized until power is removed from the scanner. A BRAKE_EN signal 110 is set active which energizes a mirror brake (such as the braking mechanism disclosed in U.S. Provisional Patent Application Ser. No. 60/100,271, filed Sep. 14, 1998, and U.S. patent application Ser. No. 08/934,487, filed Jun. 19, 1997, both applications being incorporated by reference as if fully set forth herein) which holds the scan engine's mirror (such as mirror 314 shown in FIG. 3) in a relatively fixed or neutral position. The laser diode, for example diode 310, is modulated using a LASER-EN signal 116 preferably at a rate of 1 milliseconds (mS) once every 25 mS. This modulation produces a dim but visible point of light that can be detected on objects located in the beam line. The light reflected off of the object 220 is collected by the scan engine optical system 102 and converted to an electrical signal 222 preferably by an optically band limited photo detector, such as photosensor 204.

Figure 4:
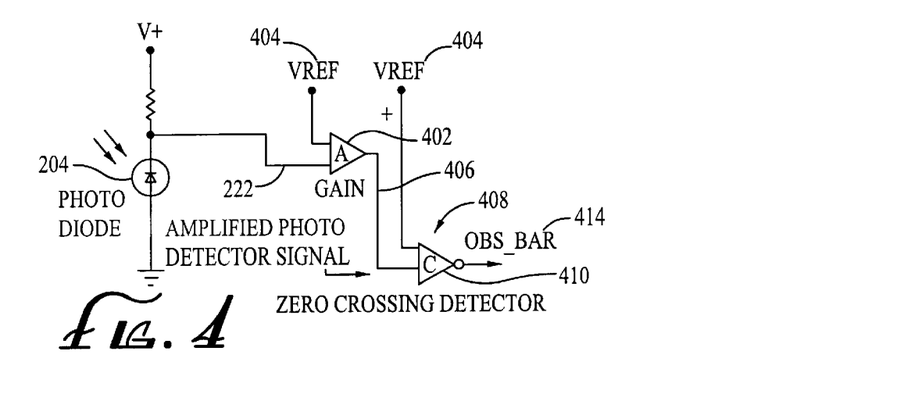
FIG. 4 is an illustrative circuit that may be contained within a control and decode engine block in accordance with one or more aspects.
Figure 5:
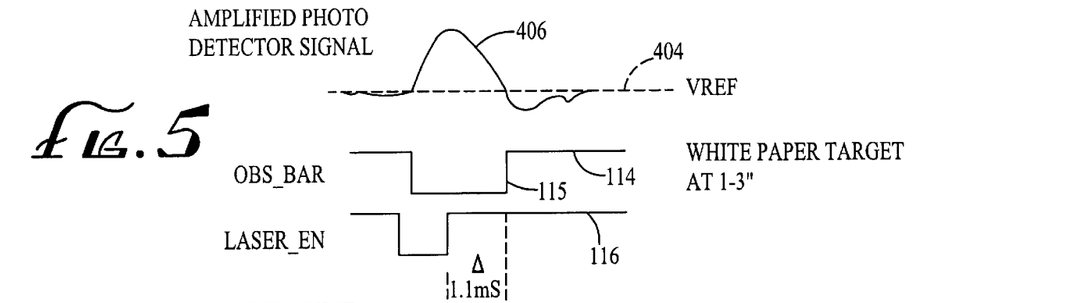
FIG. 5 is a signal response diagram illustrating the time relationship between an emitted signal and a received signal, as shown with a white paper target at 1–3"
Figure 6:
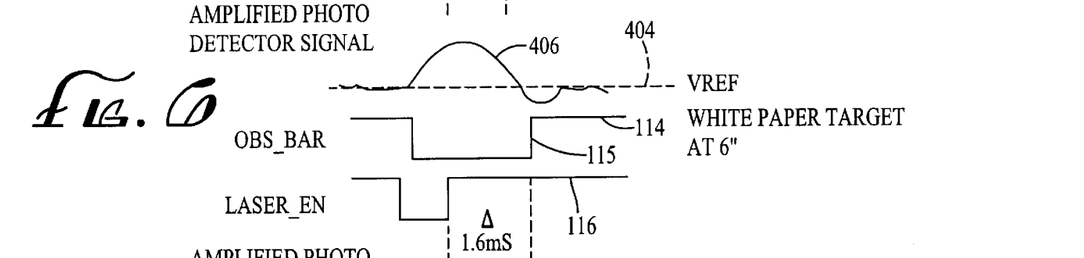
FIG. 6 is a signal response diagram illustrating the time relationship between an emitted signal and a received signal, as shown with a white paper target at 6"
Figure 7:
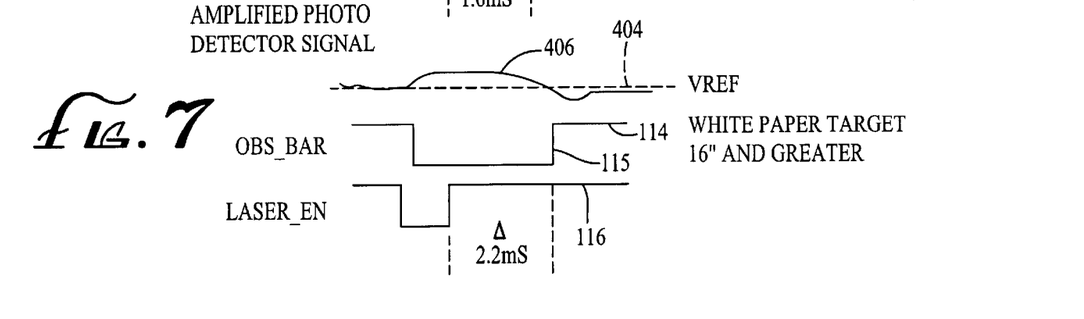
FIG. 7 is a signal response diagram illustrating the time relationship between an emitted signal and a received signal, as shown with a white paper target at 16" and greater.

As shown in FIGS. 5–7, this electrical signal 222 consists of a pulse having an amplitude and rise time that is a function of the reflected light energy from the object 220 and the distance of the object 220 from the laser light source 202. Referring in detail to FIG. 4, the return signal 222 generated by the photosensor or photodiode 204 is preferably amplified at amplifier 402 and clamped to a fixed voltage level (VREF) 404. This amplified signal 406 is then applied to a circuit, such as circuit 408, that uses a comparator 410 to compare the amplified signal 406 to the same fixed reference voltage 404. The circuit 408 is preferably configured as a zero crossing detector that has an output which will be a logic zero when the input signal polarity is positive with respect to the fixed reference 404 and a logic one when the input signal is negative with respect to the same reference voltage 404. This conditioned, binary or digitized signal is illustrated as OBS-BAR signal 114 in FIGS. 1 and 4–8.

Referring to FIGS. 5–7, a time relationship exists between the extinguishing laser diode 310 via LASER_EN 116 and the point at which the reflected pulse energy level decays below the fixed reference level 404, indicated by a positive transition of OBS_BAR signal 114. This period varies as the reflected optical power from the object 220 varies, as respectively illustrated in FIGS. 5–7 with a white paper target at 1–3", 6", and 16" and greater, and the corresponding change in time or time delta (Δ) of 1.1 mS, 1.6 mS, and 2.2 mS, respectively.

As shown in FIGS. 5–7, the surface properties of the object or target 220 is an integral part of the relationship of signals 114, 116. If the target surface, based on its color, texture, etc., exhibits a low reflectivity, the corresponding power change throughout the depth of field of the scan engine is small, which produces a small time deviation (typically a Δ of 200 microseconds ($\mu$S) from far field to near field) in the signals' 114, 116 relationship. Another factor that affects this relationship is variability of the scan engines themselves. The scan engine variability manifests itself as an increase or decrease of overall dynamic range of the time delta Δ. For example, using a white target, the overall dynamic range of the signal can vary from 1.5 mS to 900 $\mu$S from far field to near field for different scan engines. It is noted, however, that such parameters of the time relationship may only be valid during the period and under the conditions described above. Other factors, such as temperature, may affect the dynamic range of this timing relationship of signals 114, 116. As the scan engine is heated or cooled, the efficiency of the photo detector and associated circuitry may vary, increasing or decreasing the overall dynamic range of the timing relationship.

Accordingly, a fixed time limit or fixed trigger threshold fails to vary in accordance with the overall dynamic range of the above-described time relationship, causing trigger sensitivity problems that lead to ineffective or inaccurate object detection. The object detection software algorithm according to preferred embodiments disclosed herein does not rely on a fixed threshold. On the contrary, the preferred embodiments produce a trigger event based on a current trigger threshold determined by input from the received signal, such as OBS_BAR signal 114. The object detection software algorithm may advantageously normalize scan engine variations resulting from process and temperature variations. The effective range of the scanner may be increased as a scan cycle or scan event will be triggered based on a relatively small time change, shown in FIG. 8 as time range $\alpha$, which may be a configurable deviation from the current OBS-BAR position 150 preferably determined by the time relationship of a plurality of current received signals.

Figure 9A:
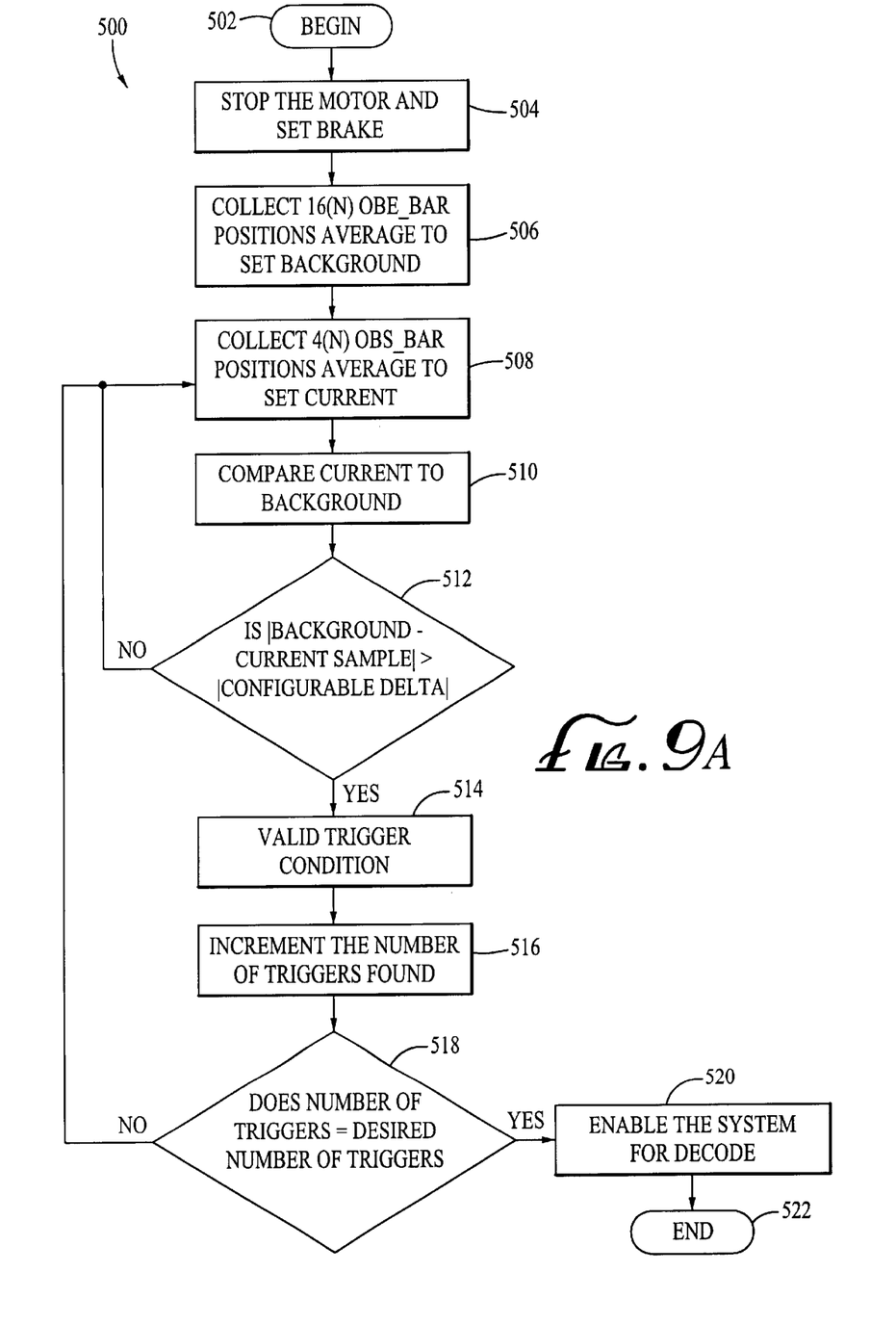
FIG. 9a is a flow chart of the software operation of an object detection algorithm according to a preferred embodiment.

Turning in detail to FIG. 9a, the object detection software 500 according to a preferred embodiment begins with the step of "begin" 502 and then the step of "stop the motor and set the brake" 504. The microcontroller or microprocessor, such as controller 206, may perform this step 504 by asserting the MODULE_EN signal 112 and BRAKE_EN signal 110 continuously. The background of the scanner's field of view is then determined at the step of "collect 16(N) OBS_BAR positions average to set background" 506. Data on the current OBS_BAR position 150 is collected via a data collection routine such as the one shown in FIG. 9b.

Figure 9B:
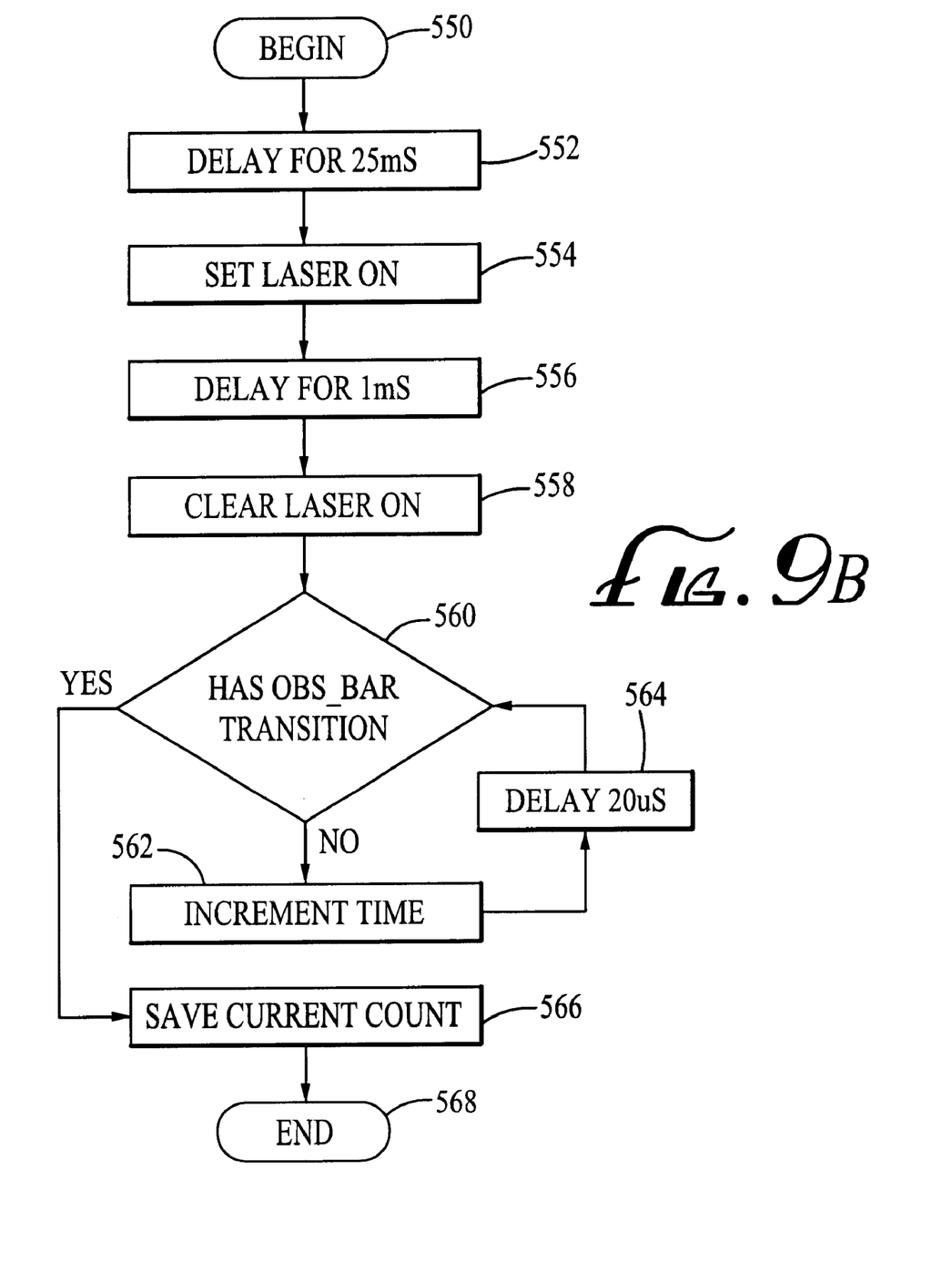

As illustrated in FIG. 9b, a preferred embodiment of the data collection routine involves pulsing or modulating the light source for a predetermined length of time. Pulsing the light source is preferably effected by asserting the LASER_EN signal 116 for 1 mS every 25 mS which produces a laser spot on the target, as shown in steps "delay for 25 mS" 552, "set laser on" 554, and "delay for 1 mS" 556.

When the LASER_EN signal 116 is released after the step of "clear laser on" 510, the OBS_BAR line 114 is sampled by the controller 206. Sampling is preferably done every 20 $\mu$S at the step "delay 20 uS" 564 until a transition, such as transition 115, occurs in the OBS_BAR signal 114 at the step of "has OBS_BAR transition" 560. As shown in FIGS. 5–7, positive transition 115 is a zero crossing of the amplified photodetector signal 406 as it decays below the fixed reference voltage level 404. Thus, a transition indicates a change in reflected light energy. As shown in FIG. 9b, if no transition is detected within the configurable time frame of 20 μS, the time of such a resolution sample loop is stored in memory at step "increment time" 516 and the step "has OBS_BAR transition" 560 is repeated. When a transition is detected, the total amount of time or total number of resolution sample loops are added together and saved at the step of "save current count" 566. Once a "count" or "count value" indicative of the amount of time from when the laser pulse stopped to when a transition has been detected (e.g., until decay) has been determined, the data collection routine ends at step "end" 568.

Returning again in detail to FIG. 9a, the data collection routine may be performed a number of times in order to determine the background of the scanner's field of view. As shown in FIG. 9a at the step of "collect 16(N) OBS_BAR positions average to set background" 506, the data collection routine has been performed sixteen times wherein sixteen different count values are stored in memory, such as memory 210 illustrated in FIG. 2, and averaged together to define an average count value of the amount of time it took for sixteen successive transitions in signal 114 to occur.

Such an average count value, or current position in time of the OBS-BAR transition, is preferably used to set the current trigger threshold or background of the scanner. As shown in the signal response diagram of FIG. 8, current OBS_BAR position 150 is illustrated as being between the near field or minimum range 152 (where the maximum power is coming back) and the far field or maximum range 154 (where the least amount of power is coming back) of the scanner. During the acquisition of the first samples or count values used to obtain the current OBS_BAR position 150, no trigger events are permitted.

Once the current OBS_BAR position 150 is obtained, i.e., once the current trigger threshold or background is set as shown in step 506 of FIG. 9a, the current trigger threshold is compared to another count sample to determine if a trigger condition is present. A trigger condition is present when the count value of the current trigger threshold or background is different than the count value of a recent current sample. When the change in transition time or the change in count value between the background and the current sample is sufficient to indicate the presence of an object, a valid trigger condition is present.

As shown in FIG. 9a, the current sample is preferably an average of a number of successive count values collected via a data collection routine such as the routine shown in FIG. 9b, and most preferably four recent count values averaged together to define a current sample average as illustrated in the step of "collect 4(N) OBS_BAR positions average to set current" 508. The current sample average is then compared to the current trigger threshold or background at step "compare current to background" 510 to determine if the change in transition times is sufficient to indicate a valid trigger condition. A valid trigger condition preferably exists when the magnitude of the difference between the background or current trigger threshold and the current sample is greater than the magnitude of a configurable delta as shown in step "is |background−current sampler|>|configurable delta|" 512. If the magnitude of the difference between the count value of the background and the count value of the current sample is greater than the magnitude of a configurable delta, then a valid trigger condition occurs at the step of "valid trigger condition" 514. Thus, if the magnitude of the difference between the count value of the background and the count value of the current sample is not greater than the magnitude of a configurable delta, a valid trigger condition is not present and the process repeats itself at the step of "collect 4(N) OBS_BAR positions average to set current" 508.

Figure 8:
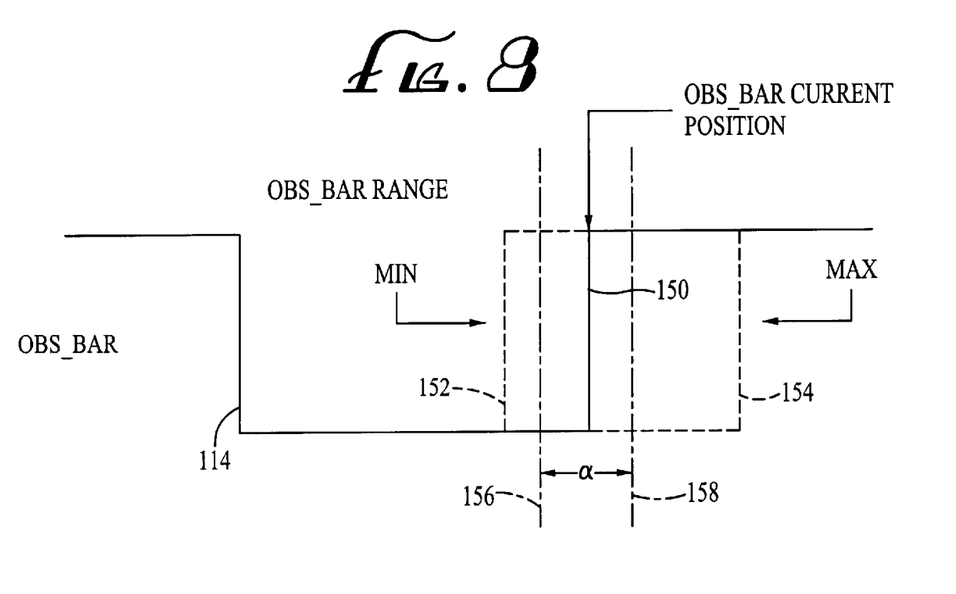
FIG. 8 is a signal response diagram illustrating the range of trigger thresholds based on the current position of an object from an optical reading unit according to one or more aspects.

FIG. 8 illustrates the timing relationship of the configurable delta and the current trigger threshold. As shown therein, the current trigger threshold or OBS_BAR current position 150 is deviated by a configurable amount (preferably +/−3 counts) to obtain a current trigger threshold range. Such a current trigger threshold range is shown as range α in FIG. 8, which is defined by a current lower trigger threshold 156 and a current upper trigger threshold 158. A valid trigger condition exists, such as that occurring in step 512, when the current sample average falls outside the current trigger threshold range α.

When a valid trigger condition exists, a scan event may be triggered. Preferably, as shown in FIG. 9b at the step of "increment the number of triggers found" 516, no scan event is triggered unless a number of desired trigger conditions has been met at the step of "does number of triggers=desired number of triggers" 518. Should the current sample average fall outside of the current trigger threshold range α enough times to satisfy step 518, a scan event is triggered and the system is enabled for decoding as shown at the step of "enable the system for decode" 520 and the object detection algorithm ends at step "end" 522. If the desired number of triggers has not been met at step 518, the process repeats itself at the step of "collect 4(N) OBS_BAR positions average to set current" 508.

When a scan event is triggered, the microcontroller releases the BRAKE_EN signal 110 and fully turns on the laser light source via LASER_EN signal 116. The scanning mechanism (such as dither mirror 312) is then activated producing a scan line and a symbol decoding sequence is initiated. This scan state or scan mode is exited by either of two conditions, namely, a successful decode read or by no decode read occurring within a configurable time period, which is preferably default at 2 seconds. Upon exiting the scan mode, the system returns to the object detection mode as shown in FIG. 9a, i.e., before another scan event is triggered, the motor is stopped and the brake is set at step 504, and another consecutive sample average of the OBS_BAR position 150 is calculated to reset the real-time trigger threshold at step 508, which is then compared to a current sample average at step 510.

Although a scanner utilizing a preferred embodiment will use only a fraction of the power needed to operate an object detection system that continuously scans a target for the presence of a bar code, such as the bar code scanning system described in U.S. Pat. No. 4,933,538, the system may optionally include a wake-up feature for initializing the object detection mode 500 shown in FIG. 9a. In this manner, the scanner advantageously begins its object detection mode 500 of pulsing or modulating a laser diode only after a wake-up event occurs.

Figure 10:
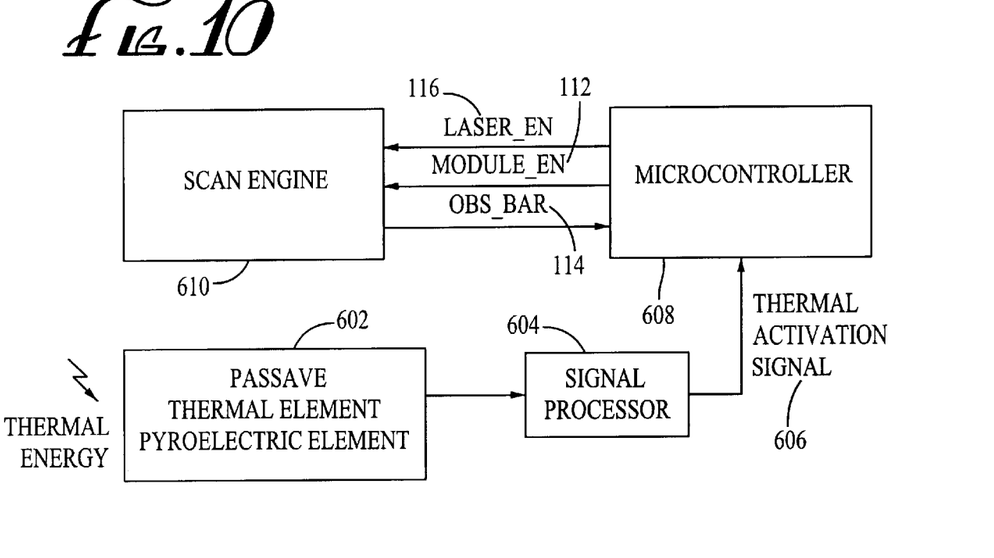
FIG. 10 is a block diagram of an object detection initiating system according to a preferred embodiment.

Such a wake-up feature is illustrated in FIG. 10 which shows a passive sensor block 602 designed to reduce operation currents and preserve the life of the scanning components. In particular, FIG. 10 shows a lower power mode system including a passive thermal element or pyroelectric element block 602 actuated by thermal energy, such as the thermal energy created by the heat of a clerk's hand as the clerk brings the symbol to be read to within the scanner's field of view. Alternatively, the passive thermal element or pyrotechnic element may be a capacitive switch, such as a capacitive touch switch commonly associated with touch-dimmer lamps. Regardless of the type of passive sensor used, the passive sensor block 602 preferably sends data to a signal processor 604 that processes the thermal energy data and determines whether to release a thermal activation signal 606 to microcontroller 608 which in turn may release a LASER_EN signal 116 and a MODULE_EN signal 112 to scan engine 610 according to certain aspects.

Figure 11:
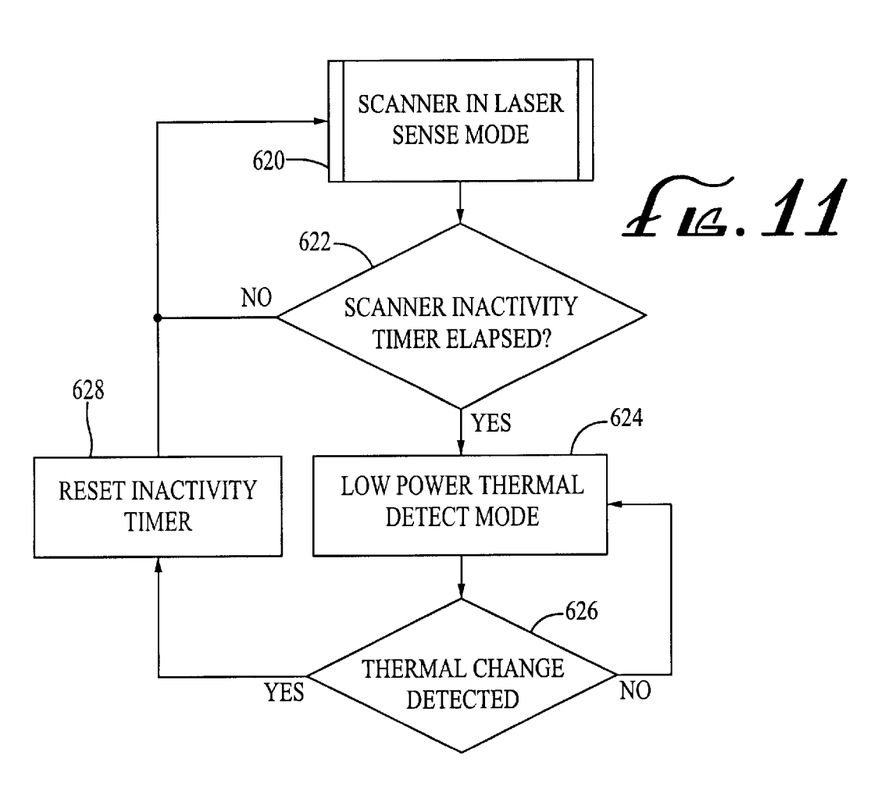
FIG. 11 is a flow chart of the software operation of the object detection initiating system shown in FIG. 10.

Turning in detail to FIG. 11, a wake-up or object detection initiating algorithm may begin with the step of "scanner in laser sense mode" 620. If the scanner remains inactive over a configurable time limit as shown in step "scanner inactivity timer elapsed" 622, step "lower power thermal detect mode" 624 is initiated until a thermal change is detected at "thermal change detected" 626 and the timer is reset at "reset inactivity timer" 628, wherein the process repeats itself at "scanner in laser sense mode" 620.

Figure 12:
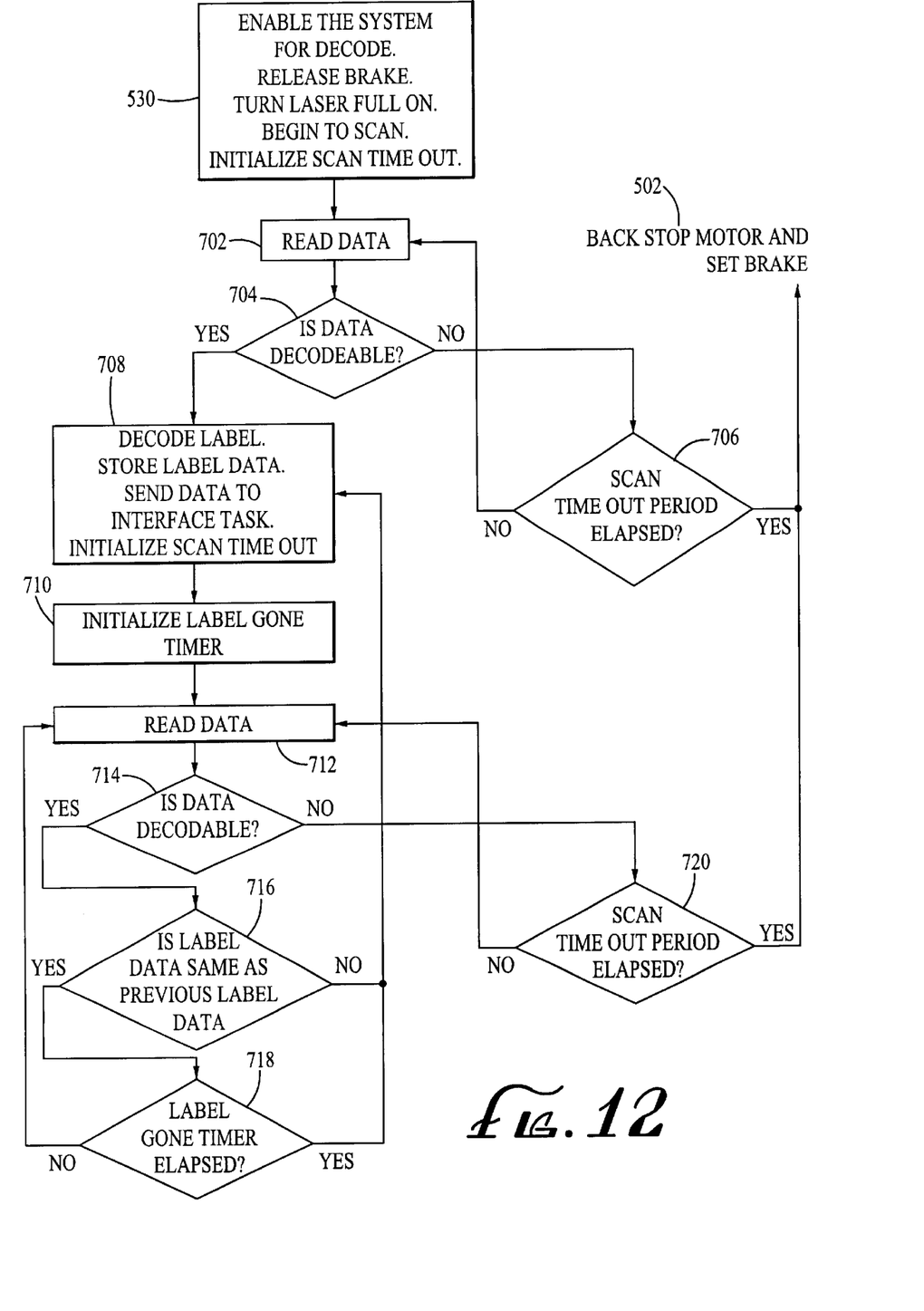
FIG. 12 is a flow chart of the software operation of a logic decoding system according to a preferred embodiment.

In order to prevent a scanner utilizing a preferred embodiment from continuously decoding the same symbol or bar code present in the scan field, a label gone or double read function may optionally be added to the end of the object detection function 500 shown in FIG. 9a. Turning in detail to FIG. 12, such a logic read algorithm preferably begins with the last step of the object detection step of "enable the system for decode" 530 (shown in FIG. 12 as "Enable the system for decode. Release brake. Turn laser full on. Begin to scan. Initialize scan time out"). Once the brake is released, the laser turned on full, and a scan is begun, the data is read at "read data" 702 and attempted to be decoded at "Is data decodable?" 704. If the data is not read before the scan time out period lapses at step "Scan time out period elapsed?" 700, step 502 of the object detection algorithm is repeated. If the data is not decodable and the scan time out period has lapsed at "Scan time out period elapsed?" 706, step 502 of the object detection algorithm is repeated. If not, the "read data" step 702 is repeated.

If the data is decodable within the scan time out period, the data is decoded, stored, and sent to an interface task at "Decode label. Store label data. Send data to interface task. Initialize scan time out" 708, the label gone timer is initialized at "Initialize label gone time" 710, and the data is read at "Read data" 712. Should the scan time out period lapse before the data can be read, at step "Scan time out period elapsed?" 720, step 502 of the object detection algorithm is repeated. If the data is decodable at "Is data decodable?" 714, the data is the same data as before at "Is label data same as previous label data" 716, and the label gone timer has not lapsed at "Label gone timer elapsed?" 718, the "Read data" step 712 is repeated. If the label-gone timer has lapsed at step 718, step 708 is repeated. Thus, a scanner utilizing a logic decode routine such as that shown in FIG. 12, in conjunction with an object detection technique of a preferred embodiment, may advantageously allow a scanner to automatically detect an object and decode a symbol without continuously decoding the same symbol present in the scan field.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A method for detecting the presence of an object with an optical scanner comprising:

pulsing a light source;

generating an electrical signal having an amplitude determined by the intensity of detected light and converting the electrical signal to a binary scan signal;

determining a first count value for a first transition in the binary scan signal;

determining a second count value for a second transition in the binary scan signal; and determining when the second count value is different than the first count value.

2. A method for detecting the presence of an object with an optical scanner according to claim 1, further comprising deviating the first count value to define a current trigger threshold range.

3. A method for detecting the presence of an object with an optical scanner according to claim 1, further comprising repeating the step of determining a first count value in order to obtain an average first count value, wherein the average first count value is used to set a current trigger threshold.

4. A method for detecting the presence of an object with an optical scanner according to claim 3, further comprising deviating the current trigger threshold to define a current trigger threshold range.

5. A method for detecting the presence of an object with an optical scanner according to claim 4, further comprising repeating the step of determining a second count value in order to obtain an average second count value, wherein the average second count value is used to set a current sample average.

6. A method for detecting the presence of an object with an optical scanner according to claim 5, further comprising the step of establishing a trigger condition when the current sample average falls outside the current trigger threshold range.

7. A method for detecting the presence of an object with an optical scanner according to claim 1, further comprising the step of detecting a thermal change in the optical scanner before initiating the step of pulsing a light source.

8. A method for detecting the presence of an object with an optical scanner according to claim 1, further comprising the step of establishing the existence of a trigger condition when the second count value is different than the firsts count value, and the step of providing full power to the light source once a desired number of trigger conditions has been established in order to initiate scanning operations.

9. A method for detecting the presence of an object with an optical scanner according to claim 8, further comprising the step of reading and decoding data during scanning operations, detecting when the same data has already been read and decoded, and detecting when the data has been removed prior to being successfully read and decoded.

10. A method for detecting the presence of an object with an optical scanner according to claim 1, further comprising the step of establishing a trigger condition when the magnitude of the difference between the first count value and the second count value is greater than the magnitude of a configurable delta.

11. An optical reader comprising:

a light source for sending out a pulsed light beam;

a detector for generating an electrical signal having an amplitude determined by the intensity of returned light detected;

a signal conditioning processor for converting the electrical signal to a binary scan signal wherein a transition in the binary scan signal occurs due to a change in light reflectivity indicative that an object is being detected; and a controller for measuring the time from when the pulsed light source is turned off to the point at which a transition in the binary scan signal occurs, wherein the controller determines a first count value for a first transition in the binary scan signal, determines a second count value for a second transition in the binary scan signal, and compares the first count value with the second count value in order to detect a trigger condition.

12. An optical reader according to claim 11, wherein the light source is a laser diode.

13. An optical reader according to claim 11, further comprising a memory in communication with the controller for storing each count value.

14. An optical reader according to claim 11, further comprising a passive sensor in communication with the signal conditioning processor for detecting a change in temperature and actuating the light source to begin pulsing.

15. An optical reader according to claim 11 wherein the first count value is deviated to define a current trigger threshold range.

16. A optical reader, such as a bar code scanner, for detecting the presence of an object, the optical reader comprising:

a laser diode for sending out a pulsed light beam;

a detector for generating a received signal of reflected light energy;

a controller for sampling the received signal until a transition occurs and measuring the amount of time from when the pulse stopped to when the transition occurred;

a memory in communication with the controller for storing a count value of the amount of time it took to successively detect the transition;

wherein the controller sets a current trigger threshold based on an average of a plurality of successive count values;

wherein the controller sets a current sample average based on an average of a plurality of recent count values;

wherein the controller compares the current trigger threshold to the current sample average to determine whether there is a sufficient change in reflected light energy indicative of the presence of an object.

17. A method for detecting the presence of an object with an optical scanner comprising:

pulsing a light source and generating a signal of returned light energy;

determining a count value indicative of the amount of time from when the pulse stopped to when a transition in the signal occurs;

setting a background defined by averaging a number of successive count values;

setting a current sample average defined by averaging a number of recent successive count values;

comparing the current sample average to the background to determine whether an object is present.

18. A method for detecting the presence of an object with an optical scanner according to claim 17, further comprising the step of establishing a trigger condition when the magnitude of the difference of the background and the current sample average is greater than the magnitude of a configurable delta.

19. A method for detecting the presence of an object with an optical scanner and reading a label on the detected object comprising the steps of:

pulsing a light source;

detecting returned light;

decoding the returned light using a decode circuit;

determining the presence of an object using a software algorithm embedded in the decode circuit; and scanning a label on the detected object to read the label, wherein the scanning step is also performed by the decode circuit.

20. A system comprising:

a light source;

a detector for detecting returned light; and decode circuitry for conditioning and decoding the returned light;

wherein the light source sends out a pulse;

wherein the detector detects the pulse;

wherein the decode circuitry determines object presence and decodes a label on a detected object.

21. A method for detecting the presence of an object with an optical scanner according to claim 1, wherein each determining step is performed by a decode circuitry; and further comprising the step of scanning a label on a detected object to read the label, wherein the scanning step is also performed by the decode circuitry.

22. A method for detecting the presence of an object with an optical scanner according to claim 1, wherein each determining step is performed without utilizing reflective tape.

23. An optical reader according to claim 11, wherein the controller is part of a decode circuitry; wherein the decode circuitry determines object presence and decodes a label on a detected object.

24. An optical reader according to claim 11, wherein the controller is part of a decode circuitry; wherein the decode circuitry determines object presence without utilizing reflective tape.

25. An optical reader according to claim 16, wherein the controller is part of a decode circuitry; wherein the decode circuitry determines object presence and decodes a label on a detected object.

26. An optical reader according to claim 16, wherein the controller is part of a decode circuitry; wherein the decode circuitry determines object presence without utilizing reflective tape.

27. A method for detecting the presence of an object with an optical scanner according to claim 17, wherein decode circuitry is used to perform the determining step, the setting a background step, the setting a current sample average step, and the comparing step; and further comprising the step of scanning a label on a detected object to read the label, wherein the scanning step is also performed by the decode circuitry.

28. A method for detecting the presence of an object with an optical scanner according to claim 17, wherein decode circuitry is used to perform the determining step, the setting a background step, the setting a current sample average step, and the comparing step, without utilizing reflective tape.

* * * * *

UNITED STATES PATENT AND TRADEMARK OFFICE
CERTIFICATE OF CORRECTION

PATENT NO.   : 6,357,659 B1
DATED        : March 19, 2002
INVENTOR(S)  : Brian M. Kelly et al.

It is certified that error appears in the above-identified patent and that said Letters Patent is hereby corrected as shown below:

Column 7,
Line 62, "sampler" should read -- sample --.

Column 10,
Line 41, "firsts" should read -- first --.

Column 11,
Line 22, "A" should read -- An --.

Signed and Sealed this

Thirteenth Day of July, 2004

JON W. DUDAS
*Acting Director of the United States Patent and Trademark Office*